Jan. 2, 1940.                H. B. DENMAN                2,185,333
                      METHOD OF MAKING BRAKE BLOCKS
                           Filed Aug. 1, 1936
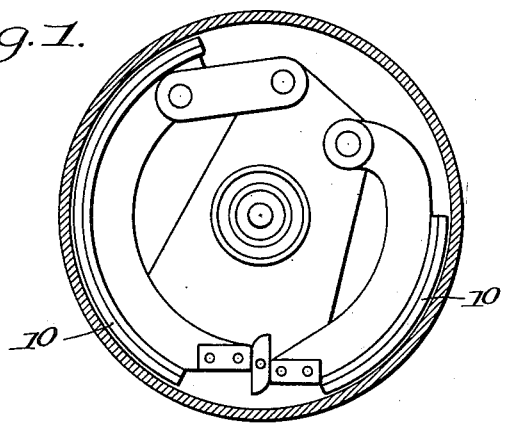
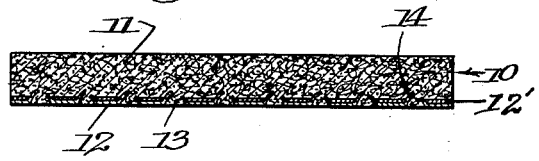
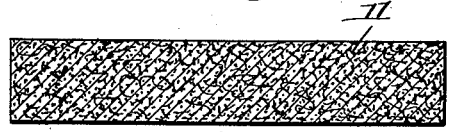
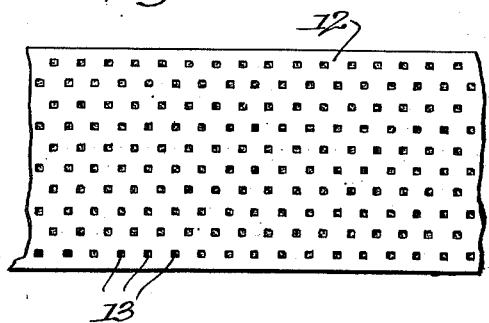
Inventor
Harry B. Denman,
By Cushman Darby & Cushman
                              Attorneys Patented Jan. 2, 1940

2,185,333

UNITED STATES PATENT OFFICE 2,185,333

METHOD OF MAKING BRAKE BLOCKS

Harry B. Denman, Detroit, Mich., assignor to Detroit Gasket & Mfg. Co., Detroit, Mich., a corporation of Michigan Application August 1, 1936, Serial No. 93,901

6 Claims. (Cl. 18—55)

The present invention relates to brakes and more particularly to frictional material associated therewith, such as brake blocks and brake linings. This improved brake material has been found very satisfactory for the braking of motor vehicles, but is useful for braking purposes generally.

It is an object of the invention to provide a brake block or lining which will be resistant to the constant abrasion and pressure associated with braking and which will not be affected by moisture, heat, oils and climatic variations. In other words, the brake block or lining is tough and strong and presents a relatively hard surface having a high coefficient of friction which will be substantially constant in its braking effect throughout the life of the product.

In making the brake block or lining, asbestos fibres and cork and a wetting agent therefor are mixed together, so that the surfaces of the fibres and cork are thoroughly wetted. The wetting agent is a solvent and hardener for a synthetic resin binder which is incorporated into the mixture in finely powdered or granulated condition and in an initial stage of reaction. A uniform mixture is produced in which the resin binder is likewise uniformly dispersed. As a result, the final product has the fibres and cork particles firmly bonded throughout the block or lining, insuring a long life under the most severe conditions.

The excellent frictional characteristics, and wear resistance and life of the block or lining, is in considerable measure, due to the uniformity of the composition, and the uniformity of dispersion of the binder obtained through the medium of the wetting agent. By having the resin completely dispersed, the cork and fibres are tightly bonded together; also less of the binder need be employed and the exposed or friction surface consists of the cork and fibres.

It is, therefore, an important feature of the present invention that a wetting agent is utilized to insure complete dispersion of the resin binder, and cause its adherence to the cork and fibres throughout the mass, so as to obtain a uniformly coherent brake block or lining.

I am aware (see British Patent 121,301) that it has been proposed to prepare a mixture of asbestos, comminuted cork and synthetic resin in powdered form, and then mold and harden the composition for braking purposes. Also, in the patents to Fisher Nos. 1,436,158 and 1,465,389 there are described friction materials in which preformed strips of asbestos and cork are impregnated with a synthetic resin and the product then suitably hardened. Such constructions are satisfactory, but lack the advantages obtained by having the resin binder thoroughly dispersed throughout the friction material.

Another very important advance marked by the present invention, and which is attributable to the uniformity of the composition and dispersion of the binder, is its freedom or resistance to "fading".

By "fading" is meant that when the brakes are applied rapidly a number of times the brake pedal will go much nearer to the floor and the car will not decelerate quickly. While with some types of lining or block, fading will occur after two or more applications of the brakes, this objectionable result with the present invention does not take place notwithstanding a great number of repeated applications of the brake. As a result, less effort is required to bring the car to a stop, and where the brake is subjected to continued severe usage, it is found that the rebound or return of the present block or lining is much faster than in the case of conventional constructions.

A further object of the invention is to provide a novel method of manufacture whereby the brake block or lining can be produced economically on a scale satisfactory for commercial manufacture. This is important, since the quantities of frictional material used in the automobile industry alone are tremendous. There is a saving in constituents of the composition, in fuel, and the method is carried out without the necessity for skilled labor or complicated machinery.

In connection with the method, the composition is first heated and compressed in a mold sufficiently to produce a self-sustaining slab or block with the composition in moldable condition. This slab is then removed from the mold and cut into strips of proper size and thickness and the strips subjected to heat and pressure in a shaping mold to produce a curved form or other desired shape. At the same time, the strip is compressed to a predetermined thickness and to produce the desired density. During this shaping operation, if desired, a base is applied to each strip for strengthening the block or lining and will be simultaneously shaped with the friction material. The product having its final thickness, hardness, and density and with the resin cured to an insoluble and infusible state, may be produced in the shaping mold, or the strip may be removed from the mold and the resin cured to its final state in an oven.

A further important feature of the invention resides in the use of a metal backing or base, particularly of a perforated metallic structure having tongues struck up therefrom, for example, as shown in the patent to Balfe 1,776,140. Such metallic backing assists in the application of the brake block or lining and, moreover, serves to strengthen and sustain it under the most severe conditions of usage.

The metallic backing or base will be united with the brake block or lining strip in the shaping mold as just described, and for this purpose the side of the base having the projections extending upwardly therefrom is coated with an adhesive solution. In the shaping mold, the adhesive film is hardened to produce a firm continuous union between the base and the strip, and at the same time the projections are embedded securely within the strip.

The resin in its granular state in the raw composition is in initially reacted condition and the curing thereof under heat and pressure through the subsequent steps of the method may be carried out to bring the resin to any desired hardness or stage of condensation. It is preferred, however, to carry out the condensation reaction to a point where the resin is insoluble and infusible.

Referring to the drawing:

Figure 1 is a side elevation of a brake with the present invention applied thereto.

Figure 2 is a sectional view of the material.

Figure 3 is a sectional view showing the strip and metallic base before they are united as in Figure 2, and Figure 4 is a bottom view of the brake block or lining.

In carrying out the present invention, the asbestos fibre is first thoroughly separated by any convenient method to break up and reduce lumps and agglomerates. Ground or comminuted cork of an appropriate size is then mixed with the asbestos in any suitable apparatus and for a sufficient time to obtain a substantially uniform mixture.

There is then added to this mixture a wetting agent which will have the properties of wetting the fibres and cork and which will be a solvent as well as a hardening or accelerating or supplementary hardening agent for the synthetic resin binder. The wetting agent is a liquid and will be mixed with the cork and fibres in such a manner as to insure the complete wetting of their surfaces throughout the mass. As a suitable wetting agent, I prefer to use an aldehyde, for example, furfural. It will be appreciated, of course, that this is a representative of a large number of agents which are also resin solvents and hardeners. Also, alcohol and acetone are useful as wetting agents and, if in excess, are evaporated after the mixing operation as required.

As a binder, I use various types of artificial or synthetic resins which are cured or hardened by heat. I prefer to use a phenol formaldehyde resin in the early stages of reaction, but other thermosetting resins are useful, such as urea-aldehyde resins, thiourea-aldehyde resins, and certain commercially available resins, such as the resin obtained by reacting soya bean protein with formaldehyde or the reaction product of soya bean protein, urea, phenol, formaldehyde, cellulose, and carbohydrates. I also use alkyd or glyptal resins and certain alkyd resins which contain soya bean oil or soya bean oil acid. The resin is introduced into the mixture in a finely powdered or granulated state and the mixing continued to insure, in cooperation with the wetting agent, uniform dispersion of the binder. The several mixing and dispersing steps may follow as continuous operations, which is preferred, or the comminuted cork and fibre mixture may be prepared and at suitable times, the wetting agent and resin added thereto and dispersed in the mass.

The wetting agent acts to soften and dissolve the resin, so that the binder is coated upon the surfaces of the cork and fibres throughout the mass and hence the cork and fibres are uniformly bonded in the final product and likewise a constant density is obtained.

A preferred composition consists of equal parts by volume of asbestos fibres and ground cork. Typical of such a composition, I use asbestos, 60 lbs.; cork, 20 lbs.; furfural, 6 lbs.; and phenolformaldehyde, 15 lbs.

For certain uses, the asbestos content and the cork content may be varied depending upon the hardness desired. For example, the range of asbestos may be from 30 lbs. to 75 lbs. and the cork from 5 lbs. to 25 lbs. The quantity of wetting agent and resin will vary accordingly, the critical quantity required being that which will satisfactorily wet the fibres and cork and assure that the binder will exercise its optimum function.

In some cases, a plasticizing agent such as glycerine or ethylene glycol, is added to the mixture to impart qualities of softness and flexibility to the final product. The plasticizer is generally used in amount of about 10% by weight of the wetting agent.

The uniform mixture as prepared is placed in a suitable mold such as one of the follower type and compressed with moderate pressure to substantially a slab form. The weight of the material used is measured and the pressure is likewise controlled, so as to obtain a predetermined thickness and weight per cubic inch. In this connection, a typical weight for a brake block or lining is substantially .40 ounce per cubic inch.

The mold is now placed in an oven and baked for just sufficient time to set the binder partially whereupon the mold is cooled and the slab removed. This slab is plastic, but sufficiently strong as to be self-sustaining and capable of being cut into strips of required dimensions. The thickness to which the strips are cut will be governed by the density desired in the final product. That is to say, a typical thickness is twice the finished thickness, so that for a $\frac{3}{16}''$ finished brake lining or block, the strip will cut to a thickness of about $\frac{3}{8}''$.

The cut strips are now placed in a standard type of cavity mold and subjected to heat and pressure to harden and set the binder, as well as to form the article of the desired curved or other shape, thickness and density.

The curing of the resin may be carried out to completion in this mold, but it is preferred to remove the strips from the mold as soon as the material has set sufficiently to retain its shape and density, and complete the curing in an oven. The resin may be cured to various states of hardness, but I prefer to carry out the condensation reaction to render the resin completely infusible and insoluble.

Referring to Figure 1, I have illustrated a conventional brake having brake blocks 10 formed in accordance with this invention.

In Figure 2, the composition layer is shown at 11 and the base layer at 12. This base may be of metal or textile fabric or any suitable material, but preferably consists of a metallic backing, perforated as shown at 13 in Figure 4, by striking up a multiplicity of projections 14, as shown in Figure 3. In forming the article of Figure 2, the perforated metal strip 12 is first coated with an adhesive solution 12', e. g., a phenolic resin dissolved in furfural and the coated surface is then applied to one surface of the friction strip 11, the union of the friction layer and metal layer being carried out in the shaping or cavity mold above described during which operation, the projections 14 are embedded within the friction layer and the adhesive is wholly or partially hardened. The metal base 12 will serve, in some cases, to reinforce the friction block or lining and the presence of the projections also will serve to strengthen and sustain the friction block or lining under the most severe usage. As will be understood, in some instances, the base 12 may be omitted.

The friction material as explained, is characterized by having the resin binder uniformly distributed throughout and by reason of the presence of the wetting agent, the binder is enabled to firmly adhere all of the fibres and cork in a compact uniformly bound mass. This gives great strength to the friction material, practically eliminates the difficulties of fading and, as heretofore stated, the abrasion resistance of the friction material, and its resistance to heat, moisture, oils, gases and other influences is very much enhanced. Since the resin is uniformly distributed throughout the body of the brake block or lining, it is unnecessary to impregnate or form a coating on the surface of the article. The frictional material while particularly useful for brake block or linings is equally suitable for clutch facings and similar applications.

It is to be understood that the forms of the invention herewith shown and described are merely illustrative of preferred embodiments and that such changes may be made as fall within the purview of one skilled in the art without departing from the spirit of the invention and the scope of the appended claims.

I claim:

1. The method of making a brake block or lining which comprises mixing together asbestos fibers and comminuted cork, wetting the surfaces of the cork and fibers with a wetting agent which is a solvent for a synthetic resin, incorporating in said mixture a partially reacted synthetic resin in granular state soluble in said wetting agent and subjecting the mixture to heat and pressure.

2. The method of making a brake block or lining which comprises mixing together asbestos fibers and comminuted cork, wetting the surfaces of the cork and fibers with a wetting agent which is a solvent for a synthetic resin, incorporating in said mixture a partially reacted synthetic resin in granular state soluble in said wetting agent and subjecting the mixture to heat and pressure to dissolve the resin and finally curing the same by further application of heat.

3. The method of making a brake block or lining which comprises mixing together asbestos fibers and comminuted cork, wetting the surfaces of the cork and fibers with a wetting agent which is a solvent for a synthetic resin, incorporating in said mixture a partially reacted synthetic resin soluble in said wetting agent and subjecting the mixture to heat and pressure.

4. The method of making a brake block or lining which comprises mixing together asbestos fibers and comminuted cork, wetting the surfaces of the cork and fibers with an aldehyde wetting agent which is a solvent for a synthetic resin, incorporating in said mixture a partially reacted synthetic resin soluble in said wetting agent and subjecting the mixture to heat and pressure.

5. The method of making a brake block or lining which comprises mixing together asbestos fibers and comminuted cork, wetting the surfaces of the cork and fibers with a wetting agent, incorporating in said mixture a partially reacted phenolic resin in granular state soluble in said wetting agent and subjecting the mixture to heat and pressure.

6. The method of making a brake block or lining which comprises mixing together asbestos fibers and comminuted cork, wetting the surfaces of the cork and fibers with furfural, incorporating in said mixture a partially reacted phenolic resin in granular state soluble in said wetting agent and subjecting the mixture to heat and pressure.

HARRY B. DENMAN.